(12) United States Patent
Flosbach et al.

(10) Patent No.: US 8,691,006 B2
(45) Date of Patent: Apr. 8, 2014

(54) NON-AQUEOUS, LIQUID COATING COMPOSITIONS

(75) Inventors: Carmen Flosbach, Wuppertal (DE); Tanja Renkes, Essen (DE); Wiebke Becker, Essen (DE)

(73) Assignee: Axalta Coating Systems IP Co., LLC, Wilmington, DE (US)

(*) Notice: Subject to any disclaimer, the term of this patent is extended or adjusted under 35 U.S.C. 154(b) by 1164 days.

(21) Appl. No.: 11/990,069

(22) PCT Filed: Sep. 21, 2006

(86) PCT No.: PCT/US2006/036843
§ 371 (c)(1),
(2), (4) Date: Feb. 4, 2008

(87) PCT Pub. No.: WO2007/035876
PCT Pub. Date: Mar. 29, 2007

(65) Prior Publication Data
US 2009/0035471 A1   Feb. 5, 2009

Related U.S. Application Data

(60) Provisional application No. 60/719,297, filed on Sep. 21, 2005.

(51) Int. Cl.
*D21H 17/07* (2006.01)

(52) U.S. Cl.
USPC .............. 106/287.25; 106/287.26; 106/287.3; 427/379; 427/385.5

(58) Field of Classification Search
USPC ........... 427/385.5; 106/287.25, 287.26, 287.3
See application file for complete search history.

(56) References Cited

U.S. PATENT DOCUMENTS

| 5,084,506 | A | * | 1/1992 | Faler et al. ............. 524/597 |
| 5,391,620 | A | | 2/1995 | Bederke et al. |
| 5,596,043 | A | | 1/1997 | Harris et al. |
| 6,403,699 | B1 | | 6/2002 | Rockrath et al. |
| 2002/0102425 | A1 | | 8/2002 | Delmotte et al. |
| 2003/0045653 | A1 | * | 3/2003 | Flosbach et al. ............. 525/440 |
| 2003/0208026 | A1 | | 11/2003 | Gras |
| 2009/0035471 | A1 | | 2/2009 | Flosbach et al. |
| 2009/0317552 | A1 | | 12/2009 | Flosbach et al. |

FOREIGN PATENT DOCUMENTS

| EP | 0982330 A1 | 3/2000 |
| JP | 02000611 | 1/1990 |
| JP | H04214783 A | 8/1992 |
| JP | 2000248046 A | 9/2000 |
| JP | 2001192541 A | 7/2001 |
| JP | 2001192605 A | 7/2001 |
| JP | 2001214119 A | 8/2001 |
| JP | 2002069430 A | 3/2002 |
| JP | 2003336006 A | 11/2003 |
| JP | 2005194352 A | 7/2005 |
| JP | 2005220284 A | 8/2005 |
| JP | 2005220291 A | 8/2005 |
| JP | 5047974 B2 | 10/2012 |
| WO | 2007067432 A1 | 6/2007 |
| WO | 2007081844 A2 | 7/2007 |

OTHER PUBLICATIONS

European Coatings Handbook, Curt R. Vincentz Verlag, Hannover, 2000, pp. 64 to 66.
Th. Klimmasch and Th. Engbert, Development of a uniform laboratory test method for assessing the car-wash scratch resistance of automotive top coats, in DFO Proceedings 32, pp. 59 to 66, Technologie-Tage, Proceedings of the seminar on Apr. 29 and 30, 1997 in Cologne, published by Deutsche Forschungsgesellschaft für Oberflächenbehandlung e.V., Adersstraße 94, 40215 Düsseldorf.
International Searching Authority, Search Report and Written Opinion for International Application No. PCT/US2006/036843, mailed Jan. 25, 2007.
The International Bureau of WIPO, International Preliminary Report on Patentability for International Application No. PCT/US2006/036843, mailed Mar. 26, 2008.
Japan Patent Office, Official Action (English translation) for Japanese Patent Application No. 2008-532388, mailed Feb. 6, 2012.

* cited by examiner

*Primary Examiner* — Robert S Walters, Jr.
(74) *Attorney, Agent, or Firm* — Ingrassia Fisher & Lorenz, P.C.

(57) ABSTRACT

Non-aqueous, liquid coating compositions which contain at least one hydroxyl-functional component A, at least one hydroxyl-functional polyurethane resin B differing from the at least one component A and at least one crosslinking agent C with groups reactive towards the hydroxyl groups of A and B, wherein the at least one component A is not solid at room temperature and/or is present in dissolved form and wherein the at least one polyurethane resin B is present as particles having a melting temperature of 40 to 180° C.

13 Claims, No Drawings

NON-AQUEOUS, LIQUID COATING COMPOSITIONS

CROSS-REFERENCE TO RELATED APPLICATION

This application is a U.S. National-Stage entry under 35 U.S.C. §371 based on International Application No. PCT/US2006/036843, filed Sep. 21, 2006 which was published under PCT Article 21(2) and which claims priority to U.S. Provisional Application No. 60/719,297, filed Sep. 21, 2005, which are all hereby incorporated in their entirety by reference.

FIELD OF THE INVENTION

The invention relates to novel non-aqueous, liquid coating compositions which contain hydroxyl-functional binders and crosslinking agents for the hydroxyl-functional binders.

DESCRIPTION OF THE PRIOR ART

Non-aqueous, liquid coating compositions based on hydroxyl-functional binders and crosslinking agents for the hydroxyl-functional binders are known. Examples are corresponding one- or two-component coating systems based on hydroxyl-functional acrylic resins (c.f. European Coatings Handbook, Curt R. Vincentz Verlag, Hannover, 2000, pages 64 to 66).

It has now been found that the per se known non-aqueous, liquid coating compositions based on hydroxyl-functional binders and crosslinking agents for the hydroxyl-functional binders may be improved if they additionally contain, apart from the hitherto conventional hydroxyl-functional binders, a specific kind of hydroxyl-functional polyurethane resins. In this way, it is, for example, possible to achieve a higher solids content of the coating composition (even at an identical or slightly higher application viscosity), improved sagging properties (even at elevated temperatures), improved storage stability and improved technological properties, in particular, good stone chip resistance and good scratch resistance, of the coating layers produced with the coating compositions.

SUMMARY OF THE INVENTION

The invention is directed to non-aqueous, liquid coating compositions which contain at least one hydroxyl-functional component A, at least one hydroxyl-functional polyurethane resin B differing from the at least one component A and at least one crosslinking agent C with groups reactive towards the hydroxyl groups of A and B, wherein the at least one component A is not solid at room temperature and/or is present in dissolved form and wherein the at least one polyurethane resin B is present as particles having a melting temperature of 40 to 180° C., in particular, 60 to 160° C.

DETAILED DESCRIPTION OF THE EMBODIMENTS

The coating compositions according to the invention are liquid, contain organic solvent(s) and have a solids content of, for example, 40 to 85 wt. %, preferably of 45 to 75 wt. %.

The solids content of the coating compositions according to the invention consists of the resin solids content and the following optional components: pigments, fillers (extenders) and non-volatile additives.

The resin solids content of the coating compositions according to the invention comprises the binder solids content comprising the components A and B and the at least one crosslinking agent C. In particular, the resin solids content of the coating compositions according to the invention consists of 50 to 90, preferably 70 to 90 wt. % of the binder solids content consisting of components A and B, 10 to 50 wt. % of one or more crosslinking agents C and 0 to 30 wt. % of one or more components D, wherein the weight percentages add up to 100 wt. %. It is preferred, that the resin solids content does not comprise any component(s) D and that it consists of 50 to 90, preferably 70 to 90 wt. % of the binder solids content consisting of the components A and B and 10 to 50 wt. %, preferably 10 to 30 wt. % of one or more crosslinking agents C, wherein the weight percentages add up to 100 wt. %.

The binder solids content consists of more than 0 to 95 wt. %, for example, 40 to 95 wt. %, preferably 50 to 95 wt. %, of the at least one hydroxyl-functional component A and 5 to less than 100, for example, 5 to 60 wt %, preferably 5 to 50 wt. %, of the at least one hydroxyl-functional polyurethane resin B, wherein the weight percentages add up to 100 wt. %. The molar ratio between the hydroxyl groups from component A to the hydroxyl groups from polyurethane resin B in the coating compositions according to the invention is, for example, 50:1 to 0.1:1.

The at least one hydroxyl-functional component A is in particular a conventional hydroxyl-functional binder. These are not solid at room temperature, but instead, for example, liquid, and/or they are soluble in an organic solvent (mixture). Hydroxyl-functional binders soluble in an organic solvent (mixture) are present in dissolved form in the coating compositions according to the invention containing organic solvent(s).

Binders A with hydroxyl groups which may be considered are conventional hydroxyl-functional binders known to the person skilled in the art. Examples are polyester, polyurethane and (meth)acrylic copolymer resins and hybrid binders derived from these classes of binders, in each case with hydroxyl values of, for example, 60 to 300 mg of KOH/g and number-average molar masses of 500 to 10,000.

All the number-average molar mass data stated in the present description are number-average molar masses determined or to be determined by gel permeation chromatography (GPC; divinylbenzene-crosslinked polystyrene as the immobile phase, tetrahydrofuran as the liquid phase, polystyrene standards).

The polyurethane resins B are hydroxyl-functional resins, which are present in the coating compositions according to the invention as particles, in particular with a non-spherical shape, and have a melting temperature of 40 to 180° C., in particular 60 to 160° C. The melting temperatures are not in general sharp melting points, but instead the upper end of melting ranges with a breadth of, for example, 30 to 150° C. The melting ranges and thus the melting temperatures may be determined, for example, by DSC (differential scanning calorimetry) at heating rates of 10 K/min. The polyurethane resins B have hydroxyl values of, for example, 50 to 300 mg KOH/g.

The polyurethane resins B are insoluble or virtually insoluble in the coating compositions and are present therein as particles. The polyurethane resins B are only very slightly, if at all, soluble in organic solvents conventional in coatings, the solubility amounting, for example, to less than 10, in particular less than 5 g per liter of butyl acetate at 20° C.

The production of hydroxyl-functional polyurethane resins is known to the person skilled in the art; in particular, they may be produced by reacting polyisocyanate(s) with polyol(s) in the excess. Polyols suitable for the production of the polyurethane resins B are not only polyols in the form of low molar mass compounds defined by empirical and structural formula but also oligomeric or polymeric polyols with number-average molar masses of, for example, up to 800, for example, corresponding hydroxyl-functional polyethers, polyesters or polycarbonates; low molar mass polyols defined by an empirical and structural formula are, however, preferred. The person skilled in the art selects the nature and proportion of the polyisocyanates and polyols for the production of polyurethane resins B in such a manner that polyurethane resins B with the above-mentioned melting temperatures and the above-mentioned solubility behavior are obtained.

The hydroxyl-functional polyurethane resins B may be produced in the presence of a suitable organic solvent (mixture), which, however, makes it necessary to isolate the polyurethane resins obtained in this manner or remove the solvent therefrom. Preferably the production of the polyurethane resins B is, however, carried out without solvent and without subsequent purification operations.

In a first preferred embodiment, the polyurethane resins B are polyurethane diols which can be prepared by reacting 1,6-hexane diisocyanate with a diol component in the molar ratio x:(x+1), wherein x means any desired value from 2 to 6, preferably, from 2 to 4, and the diol component is one single diol, in particular, one single (cyclo)aliphatic diol with a molar mass in the range of 62 to 600, or a combination of diols, preferably two to four, in particular two or three diols, wherein in the case of a diol combination each of the diols preferably constitutes at least 10 mol % of the diols of the diol component. In the case of a diol combination, it is preferred, that at least 70 mol %, in particular, 100 mol % of the diols are (cyclo)aliphatic diols, each with a molar mass in the range of 62 to 600.

The term "(cyclo)aliphatic" used in the description and the claims encompasses cycloaliphatic, linear aliphatic, branched aliphatic and cycloaliphatic with aliphatic residues. Diols differing from (cyclo)aliphatic diols accordingly comprise aromatic or araliphatic diols with aromatically and/or aliphatically attached hydroxyl groups. One example is bisphenol A. Diols differing from (cyclo)aliphatic diols may furthermore comprise oligomeric or polymeric diols with number-average molar masses of, for example, up to 800, for example, corresponding polyether, polyester or polycarbonate diols.

The production of the polyurethane diols can be carried out in the presence of a suitable organic solvent (mixture), followed by isolation of the polyurethane diols so prepared. Preferably, the production of the polyurethane diols is carried out without solvent and without subsequent purification operations.

1,6-hexane diisocyanate and the diol component are reacted stoichiometrically with one another in the molar ratio x mol 1,6-hexane diisocyanate:(x+1) mol diol, wherein x means any desired value from 2 to 6, preferably from 2 to 4.

One single diol, in particular, one single (cyclo)aliphatic diol with a molar mass in the range of 62 to 600 is used as the diol component. It is also possible to use a combination of diols, preferably two to four, in particular two or three diols, wherein each of the diols preferably constitutes at least 10 mol % of the diols of the diol component and wherein it is further preferred, that at least 70 mol %, in particular 100 mol % of the diols are (cyclo)aliphatic diols, each with a molar mass in the range of 62 to 600.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion or proportions in the form of pure diol. Each of the diols preferably constitutes at least 10 mol % of the diols of the diol component.

Examples of diols which are possible as one single diol of the diol component are ethylene glycol, the isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol.

Examples of diols which are possible as constituents of the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600.

1,6-hexane diisocyanate and the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions, for example, such that 1,6-hexane diisocyanate is initially reacted with part of the diol component before further reaction with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethane diols are obtained. When low molar mass diols defined by empirical and structural formula are used for synthesis of the polyurethane diols, their calculated molar masses are in the range of 522 or above, for example, up to 2200.

The polyurethane diols assume the form of a mixture exhibiting a molar mass distribution. The polyurethane diols do not, however, require working up and may be used directly as hydroxyl-functional polyurethane resins B.

In a second preferred embodiment, the polyurethane resins B are polyurethane diols which can be prepared by reacting a diisocyanate component and a diol component in the molar ratio x:(x+1), wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %.

The production of the polyurethane diols can be carried out in the presence of a suitable organic solvent (mixture), followed by isolation of the polyurethane diols so prepared. Preferably, the production of the polyurethane diols is carried out without solvent and without subsequent purification operations.

The diisocyanate component and the diol component are reacted stoichiometrically with one another in the molar ratio x mol diisocyanate:x+1 mol diol, wherein x represents any value from 2 to 6, preferably from 2 to 4.

50 to 80 mol % of the diisocyanate component is formed by 1,6-hexane diisocyanate, and 20 to 50 mol % by one or two diisocyanates selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The diol component consists to an extent of 20 to 100 mol % of at least one linear aliphatic alpha,omega-C2-C12-diol and to an extent of 0 to 80 mol % of at least one diol differing from linear aliphatic alpha,omega-C2-C12-diols. The diol component preferably consists of no more than four different diols, in particular only of one to three diols. In the case of only one diol, it accordingly comprises a linear aliphatic alpha,omega-C2-C12-diol. In the case of a combination of two, three or four diols, the diol component consists to an extent of 20 to 100 mol %, preferably of 80 to 100 mol %, of at least one linear aliphatic alpha,omega-C2-C12-diol and to an extent of 0 to 80 mol %, preferably of 0 to 20 mol % of at least one diol differing from linear aliphatic alpha,omega-C2-C12-diols and preferably also from alpha,omega-diols with more than 12 carbon atoms. The at least one diol differing from linear aliphatic alpha,omega-C2-C12-diols and preferably also from alpha,omega-diols with more than 12 carbon atoms comprises in particular (cyclo)aliphatic diols defined by empirical and structural formula and with a low molar mass in the range of 76 to 600. The proportion of possible non-(cyclo)aliphatic diols preferably amounts to no more than 30 mol % of the diols of the diol component. In the case of a diol combination, each diol preferably makes up at least 10 mol % of the diol component.

Preferably, the diol component does not comprise any non-(cyclo)aliphatic diols. Most preferably, it does not comprise any diols that are different from linear aliphatic alpha,omega-C2-C12-diols, but rather consists of one to four, preferably, one to three, and in particular only one linear aliphatic alpha,omega-C2-C12-diol.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion or proportions in the form of pure diol. Each of the diols preferably constitutes at least 10 mol % of the diols of the diol component.

Examples of linear aliphatic alpha,omega-C2-C12-diols that may be used as one single diol or as constituents of the diol component are ethylene glycol, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-C2-C12-diols and may be used in the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 76 to 600.

The diisocyanates of the diisocyanate component and the diol or diols of the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions or into individual diols, for example, such that the diisocyanates are initially reacted with part of the diol component before further reaction with the remaining proportion of the diol component. Equally, however, the diisocyanate component may also be divided into two or more portions or into the individual diisocyanates, for example, such that the hydroxyl components are initially reacted with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethane diols are obtained. When low molar mass diols defined by empirical and structural formula are used for synthesis of the polyurethane diols, their calculated molar masses are in the range of 520 or above, for example, up to 2200.

The polyurethane diols assume the form of a mixture exhibiting a molar mass distribution. The polyurethane diols do not, however, require working up and may be used directly as hydroxyl-functional polyurethane resins B.

If, in individual cases, a proportion of the diol component used for the synthesis of those polyurethane diols according to the preferred embodiments stated above is replaced by a triol component comprising at least one triol, polyurethane resins B are obtained which are branched and/or more highly hydroxyl-functional compared to the respective polyurethane diols. Embodiments with such polyurethane resins B are themselves further preferred embodiments. For example, up to 70% of the diols of the diol component in molar terms may be replaced by the triol(s) of the triol component. Examples of triols usable as constituent(s) of a corresponding triol component are trimethylolethane, trimethylolpropane and/or glycerol. Glycerol is preferably used alone as a triol component.

The at least one hydroxyl-functional polyurethane resin B is present in particulate form, in particular in the form of particles with a non-spherical shape, in the coating compositions. The average particle size (mean particle diameter) of the polyurethane resin B particles determined by means of laser diffraction is, for example, 1 to 100 µm. The polyurethane resin B particles may be formed by grinding (milling) of the solid polyurethane resin(s) B; for example, conventional powder coat production technology may be used for that purpose. The polyurethane resin B particles may either be stirred or mixed as a ground powder into the per se liquid coating composition or liquid constituents thereof, wherein it is possible subsequently to perform additional wet grinding or dispersing of the polyurethane resin B particles, for example, by means of a bead mill, in the resultant suspension.

A further method for forming the polyurethane resin B particles involves hot dissolution of the at least one polyurethane resin B in a dissolution medium and subsequent polyurethane resin B particle formation during and/or after cooling, in particular, dissolving the at least one polyurethane resin B in a proportion or the entirety of component A with heating to the melting temperature or above, for example, to temperatures of 40 to above 180° C., whereupon the polyurethane resin B particles may form during and/or after the subsequent cooling. The component A used as dissolution medium for the at least one polyurethane resin B may here be present as such, in liquid or molten form, or as a solution in organic solvent(s). Thorough mixing or stirring is preferably performed during cooling. Dissolution of the at least one polyurethane resin B may also be performed with heating in organic solvent, wherein the formation of the polyurethane resin B particles, which proceeds during and/or after the subsequent cooling, may proceed in the solvent itself or after mixing of the resultant, as yet uncooled solution with the component A. By using the method of hot dissolution and subsequent polyurethane resin B particle formation during and/or after cooling, it is in particular possible to produce polyurethane resin B particles with average particle sizes at the lower end of the range of average particle sizes, for example, in the range of 1 to 50 µm, in particular 1 to 30 µm.

As already stated, the coating compositions according to the invention contain one or more crosslinking agents C with groups reactive towards the hydroxyl groups of A and B. These comprise conventional crosslinking agents known to the person skilled in the art for coating systems based on hydroxyl-functional binders, for example, transesterification crosslinking agents; free or blocked polyisocyanate crosslinking agents; aminoplast resin crosslinking agents such as, melamine-formaldehyde resins; and/or trisalkoxycarbonyl aminotriazine crosslinking agents.

The coating compositions according to the invention may contain one or more further components D which contribute towards the resin solids content. The term "components D" encompasses components containing no hydroxyl groups, these components in particular comprising corresponding resins. Examples are physically drying resins or resins which may be chemically cured by reactions which proceed without involving hydroxyl groups.

One, some or each of components A, B, C and D may contain free-radically polymerizable olefinic double bonds. The coating compositions according to the invention may then be cured not only by the reaction of the hydroxyl groups of components A and B with the groups of the crosslinking agent(s) C which are reactive towards said hydroxyl groups, but additionally by free-radical polymerization of the olefinic double bonds, in particular by photochemically induced free-radical polymerization. Such compositions are also known as "dual-cure" coating compositions.

The coating compositions according to the invention contain organic solvent(s) and they have a solids content of, for example, 40 to 85 wt. %, preferably 45 to 75 wt. %. The organic solvent content is, for example, 15 to 60 wt. %, preferably 25 to 55 wt. %; the sum of the wt.-% of the solids content and the organic solvent content is here, for example, 90 to 100 wt.-% (any possible difference in the corresponding range of above 0 to 10 wt.-% to make up to the total of 100 wt. % is in general formed by volatile additives). The organic solvents are in particular conventional coating solvents, for example, glycol ethers, such as, butyl glycol, butyl diglycol, dipropylene glycol dimethyl ether, dipropylene glycol monomethyl ether, ethylene glycol dimethylether; glycol ether esters, such as, ethyl glycol acetate, butyl glycol acetate, butyl diglycol acetate, methoxypropyl acetate; esters, such as, butyl acetate, isobutyl acetate, amyl acetate; ketones, such as, methyl ethyl ketone, methyl isobutyl ketone, diisobutyl ketone, cyclohexanone, isophorone; alcohols, such as, methanol, ethanol, propanol, butanol; aromatic hydrocarbons, such as, xylene, Solvesso® 100 aromatic fluids (mixture of aromatic hydrocarbons with a boiling range from 155° C. to 185° C.), Solvesso® 150 aromatic fluids (mixture of aromatic hydrocarbons with a boiling range from 182° C. to 202° C.) both supplied by ExxonMobil Corporation of Irving, Tex. and aliphatic hydrocarbons.

Apart from the solvents, the coating compositions may contain further conventional coating additives, for example, inhibitors, catalysts, levelling agents, wetting agents, anticratering agents, antioxidants and/or light stabilizers. The additives are used in conventional amounts known to the person skilled in the art. In case of dual cure coating compositions photoinitiators are contained in general.

The coating compositions may also contain transparent pigments, color-imparting and/or special effect-imparting pigments and/or fillers, for example, corresponding to a ratio by weight of pigment plus filler:resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, coated silicon dioxide pigments. Examples of fillers are silicon dioxide, aluminum silicate, barium sulfate, calcium carbonate and talc.

The coating compositions according to the invention are non-aqueous liquid coating compositions. However, it is also possible to prepare similar aqueous coating compositions which contain at least one polyurethane resin of the B type present as particles having a melting temperature of 40 to 180° C. In that case the binders of the A type may be converted into the aqueous phase, for example, with addition of external emulsifiers and water. Nonaqueous, but water-dilutable binders of the A type contain conventional hydrophilic groups. Examples of these are nonionic hydrophilic groups, such as polyethylene oxide units, and/or ionic groups or groups convertible into ionic groups. Such binders may be converted into the aqueous phase by addition of water or by addition of neutralizing agent and water. If an aqueous coating composition is produced it is preferred to add the at least one polyurethane resin of the B type to the at least one water-dilutable binder of the A type before converting the latter into the aqueous phase.

The coating compositions may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer or in pigment-free form for the production of an outer clear top coat layer or a transparent sealing layer of a multilayer coating. They may, for example, be used for the production of a clear top coat layer on a previously applied color-imparting and/or special effect-imparting predried base coat layer.

The coating compositions may be applied by means of conventional application methods, in particular by spraying onto any desired uncoated or precoated substrates, for example, of metal or plastics. The coating compositions according to the invention may exhibit low application viscosities at a comparatively high resin solids content. This is advantageous in the case of spray application, because it is possible then to use conventional spray application units, as are used for the application of liquid coatings in industrial coating facilities.

Once applied, layers of the coating compositions according to the invention may initially be flashed off to remove solvent, for example, for one to five minutes at 20 to 80° C. Thermal curing then proceeds at object temperatures above the melting temperature of the hydroxyl-functional polyurethane resin(s) B contained in the corresponding coating composition, for example, for 5 to 30 minutes at 40 to 220° C., for example, by baking. If the difference between the melting temperature and the actual curing temperature is sufficiently large, it is possible initially to effect only or substantially only the melting of the polyurethane resin B particles, before the actual crosslinking subsequently proceeds during and/or after a further increase in temperature to the curing temperature. During and/or after melting the polyurethane resin B particles may become incorporated into the resin matrix.

If the coating compositions according to the invention are dual-cure coating compositions, thermal curing is combined with curing by free-radical polymerization of olefinic double bonds induced by irradiation with high-energy radiation, in particular UV radiation. Thermal curing and radiation curing may here proceed simultaneously or in any desired order. Melting of the polyurethane resin B particles must, however, be ensured prior to curing.

EXAMPLES

Examples 1a to 1l

Preparation of Polyurethane Diols

Polyurethane diols were produced by reacting HDI (1,6-hexane diisocyanate) or a mixture of HDI and DCMDI (dicyclohexylmethane diisocyanate) with one or more diols in accordance with the following general synthesis method:

One diol or a mixture of diols was initially introduced into a 2 liter four-necked flask equipped with a stirrer, thermometer and column and 0.01 wt. % dibutyltin dilaurate, relative to the initially introduced quantity of diol(s), were added. The mixture was heated to 80° C. HDI or a HDI/DCMDI mixture was then apportioned and a temperature was maintained so that the hot reaction mixture did not solidify. The reaction mixture was stirred until no free isocyanate could be detected (NCO content<0.1%). The hot melt was then discharged and allowed to cool and solidify.

The melting behavior of the resultant polyurethane diols was investigated by means of DSC (differential scanning calorimetry, heating rate 10 K/min).

Examples 1a to 1l are shown in Table 1. The Table states which reactants were reacted together in what molar ratios and the final temperature of the melting process measured by DSC is stated in ° C.

TABLE 1

| Example | Mols HDI | Mols DCMDI | Mols diol A | Mols diol B | Mols diol C | Final temperature of the melting process |
|---|---|---|---|---|---|---|
| 1a | 2 |  | 2 PROP | 1 HEX |  | 131° C. |
| 1b | 2 |  | 1 PROP | 2 HEX |  | 150° C. |
| 1c | 2 |  | 0.5 PROP | 2.5 HEX |  | 147° C. |
| 1d | 2 |  | 3 PENT |  |  | 137° C. |
| 1e | 3 |  | 1.33 PENT | 1.33 PROP | 1.33 HEX | 118° C. |
| 1f | 2 |  | 1 PENT | 1 PROP | 1 HEX | 115° C. |
| 1g | 2 |  | 1 BPA | 2 HEX |  | 149° C. |
| 1h | 2 |  | 0.1 DFA | 1.3 PROP | 1.6 HEX | 113° C. |
| 1j | 1.5 | 0.5 | 1 PROP | 2 HEX |  | 140° C. |
| 1k | 1.5 | 0.5 | 1 PENT | 1 PROP | 1 HEX | 105° C. |
| 1l | 1.5 | 0.5 | 3 PENT |  |  | 126° C. |

BPA: bisphenol A
DFA: dimer fatty alcohol
HEX: 1,6-hexanediol
PENT: 1,5-pentanediol
PROP: 1,3-propanediol

Examples 2a to 2e

Preparation of Polyurethane Polyols

Polyurethane polyols were produced by reacting HDI or a mixture of HDI and DCMDI with a mixture of GLY (glycerol) and one or more diols in accordance with the following general synthesis method:

The polyols were initially introduced into a 2 liter four-necked flask equipped with a stirrer, thermometer and column and 0.01 wt. % dibutyltin dilaurate, relative to the initially introduced quantity of polyols, were added. The mixture was heated to 80° C. HDI or a HDI/DCMDI mixture was then apportioned and a temperature was maintained so that the hot reaction mixture did not solidify. The reaction mixture was stirred until no free isocyanate could be detected (NCO content<0.1%). The hot melt was then discharged and allowed to cool and solidify.

The melting behavior of the resultant polyurethane polyols was investigated by means of DSC (differential scanning calorimetry, heating rate 10 K/min).

Examples 2a to 2e are shown in Table 2. The Table states which reactants were reacted together in what molar ratios and the final temperature of the melting process measured by DSC is stated in ° C.

TABLE 2

| Example | Mols HDI | Mols DCMDI | Mols GLY | Mols Diol A | Mols Diol B | Mols Diol C | Final temperature of the melting process |
|---|---|---|---|---|---|---|---|
| 2a | 2 | | 1 | 2 HEX | | | 130° C. |
| 2b | 2 | | 2 | 1 HEX | | | 104° C. |
| 2c | 2 | | 0.1 | 0.9 HEX | 1 PROP | 1 PENT | 114° C. |
| 2d | 2 | | 1 | 1 HEX | 1 PENT | | 101° C. |
| 2e | 1.5 | 0.5 | 1 | 2 HEX | | | 117° C. | cf. Table 1 for abréviations.

Example 3

Production of a Clear Coat Composition and an Outer Clear Coat Layer of a Multi-Layer Coating for Comparison Purposes A base was prepared by mixing the following components:

- 61.6 parts of a 65 wt-% solution of a methacrylic copolymer (acid value 5 mg KOH/g, hydroxyl value 147 mg KOH/g) in a 2:1 mixture of Solvesso ® 100 aromatic fluids and butyl acetate
- 6.7 parts of a 65 wt-% solution of a branched polyester (acid value 41 mg KOH/g, hydroxyl value 198 mg KOH/g, number-average molecular mass 1000) in Solvesso ® 100 aromatic fluids
- 5.3 parts of ethoxypropyl acetate
- 6.8 parts of Solvesso ® 150 aromatic fluids
- 1.2 parts of Tinuvin ® 292 light protecting agent from supplied by BASF of Florham Park, New Jersey
- 1.2 parts of Tinuvin ® 384 UV-absorber from supplied by BASF of Florham Park, New Jersey
- 2.0 parts of butyl acetate
- 4.3 parts of butyl diglycol acetate
- 4.4 parts of butyl glycol acetate
- 6.5 parts of Solvesso ® 100 aromatic fluids A clear coat was prepared by mixing 100 pbw (parts by weight) of the base with 50 parts of a 68 wt-% solution of a polyisocyanate hardener mixture (isocyanurate of isophorone diisocyanate and isocyanurate of hexamethylene diisocyanate in a weight ratio of 2:1) in a 2:1 mixture of Solvesso® 100 aromatic fluids and butyl acetate.

The initial flow time according to DIN EN ISO 2431 with a DIN 4 cup at 20° C. was determined directly after mixing the base and the polyisocyanate hardener (28 seconds). The pot-life of the clear coat in terms of the time period for doubling the initial flow time was two hours.

A metal panel provided with a cataphoretic primer and a 35 μm thick hydroprimer surfacer layer applied thereto and baked was spray-coated with a black waterborne base coat in a dry layer thickness of 15 μm, flashed off for 5 minutes at 70° C. and then spray-coated with the clear coat in a vertical position in a wedge shape with a layer thickness gradient from 10 μm to 70 μm dry layer thickness, and after 10 minutes flashing off at room temperature, baking was carried out for 30 minutes at 130° C. (object temperature). The clear coat sag limit was visually determined.

A metal panel provided with a cataphoretic primer and a 35 μm thick hydroprimer surfacer layer applied thereto and baked was spray-coated with a black waterborne base coat in a dry layer thickness of 15 μm, flashed off for 5 minutes at 70° C. and then spray-coated with the clear coat in 40 μm dry layer thickness, and after 10 minutes flashing off at room temperature, baking was carried out for 30 minutes at 130° C. (object temperature). Wash scratching resistance was determined by measurement of the residual gloss before and after reflow in % (ratio of initial gloss of the multi-layer coating to its gloss after wash scratching, gloss measurement at an angle of illumination of 20° in each case; reflow means a one hour exposure of the scratched panel to an object temperature of 60° C. in a laboratory oven). Scratching was carried out using the laboratory-scale Amtec Kistler car-wash (cf. Th. Klimmasch and Th. Engbert, Development of a uniform laboratory test method for assessing the car-wash scratch resistance of automotive top coats, in DFO Proceedings 32, pages 59 to 66, Technologie-Tage, Proceedings of the seminar on Apr. 29 and 30, 1997 in Cologne, published by Deutsche Forschungsgesellschaft für Oberflächenbehandlung e.V., Adersstraße 94, 40215 Düsseldorf.)

Examples 4a to 4i

Production of Clear Coat Compositions and Outer Clear Coat Layers of Multi-Layer Coatings According to the Invention Solid polyurethane diols of Examples 1a, d, e, f, h, k, l and solid polyurethane polyols of Examples 2a and 2d were in each case comminuted, ground and sieved by means of grinding and sieving methods conventional for the production of powder coatings and, in this manner, converted into binder powders with an average particle size of 50 μm (determined by means of laser diffraction).

Example 3 was repeated several times wherein part of the hydroxyl-functional methacrylic copolymer was replaced by a pulverulent polyurethane diol or polyurethane polyol prepared according to the procedure described in the preceding paragraph. The replacement was performed by substituting the pulverulent polyurethane diol or polyol for part of the solution of the methacrylic copolymer in each case according to a 10 mol-% or in a second series in each case according to a 20 mol-% substitution of OH. Where necessary, the initial flow time was adjusted to the same value as in Example 3.

Pot-life, sag limit and wash scratching resistance were determined under the same conditions as in Example 3.

Table 3 shows the pot-life, the measured sag limit in μm and the wash scratching resistance, with reference to Examples 3 and 4a to 4i in each case for a 10 mol-% or a 20 mol-% substitution of OH. The first stated value in each case relates to the 10 mol-% and the second value to the 20 mol-% substitution.

TABLE 3

| Examples (OH-funct. polyurethane powder used) | Pot-life (hours) | Sag limit (μm) | Residual gloss before reflow (%) | Residual gloss after reflow (%) |
|---|---|---|---|---|
| 3 (./.) | 2 | 33 | 46 | 67 |
| 4a (1a) | 2.4; 2.8 | ./.; 34 | ./.; 47 | ./.; 67 |
| 4b (1d) | ./.; 2.6 | ./.; 35 | ./.; 48 | ./.; 68 |
| 4c (1e) | 2.1; ./. | 34; ./. | ./.; ./. | ./.; ./. |
| 4d (1f) | 2.4; ./. | 36; ./. | 46; ./. | 68; ./. |
| 4e (1h) | ./.; 2.4 | ./.; 34 | ./.; ./. | ./.; ./. |
| 4f (1k) | ./.; 2.4 | ./.; 36 | ./.; ./. | ./.; ./. |
| 4g (1l) | 2; ./. | 36; ./. | 46; ./. | 68; ./. |
| 4h (2a) | 2.6; ./. | 37; ./. | 49; ./. | 71; ./. |
| 4i (2d) | ./.; 2.8 | ./.; 38 | ./.; ./. | ./.; ./. |

Example 5

Production of a Clear Coat Composition and an Outer Clear Coat Layer of a Multi-Layer Coating for Comparison Purposes A clear coat was prepared by mixing the following components:

---

53.3 parts of a 65 wt-% solution of a methacrylic copolymer (acid value 20 mg KOH/g, hydroxyl value 119 mg KOH/g) in a 4:1 mixture of Solvesso ® 100 aromatic fluids and butanol
28.0 parts of Luwipal ® 018 melamine resin from BASF of Florham Park, New Jersey
11.8 parts of Solvesso ® 150 aromatic fluids
0.9 parts of Tinuvin ® 1130 UV absorber from BASF of Florham Park, New Jersey
0.9 parts of Tinuvin ® 144 light protecting agent from of Florham Park, New Jersey
0.9 parts of Nacure ® 5225 catalyst from King Industries of Norwalk, Connecticut
4.2 parts of Solvesso ® 100 aromatic fluids

---

The storage stability of the clear coat at 40° C. was determined as follows: The initial flow time according to DIN EN ISO 2431 with a DIN 4 cup at 20° C. was determined (28 seconds). Then the clear coat composition was stored at 40° C. for 2 weeks and the flow time was measured again (42 seconds).

Application of the clear coat and determination of its sag limit and its wash scratching resistance was performed under the same conditions as described in Example 3.

Examples 6a to 6i

Production of Clear Coat Compositions and Outer Clear Coat Layers of Multi-Layer Coatings According to the Invention Example 5 was repeated several times wherein part of the hydroxyl-functional methacrylic copolymer was replaced by a pulverulent polyurethane diol or polyurethane polyol prepared as described in Examples 4a to 4i. The replacement was performed by substituting the pulverulent polyurethane diol or polyol for part of the solution of the methacrylic copolymer in each case according to a 10 mol-% or in a second series in each case according to a 20 mol-% substitution of OH. Where necessary, the initial flow time was adjusted to the same value as in Example 5.

Storage stability, sag limit and wash scratching resistance were determined under the same conditions as in Example 5.

Table 4 shows the storage stability, the measured sag limit in μm and the wash scratching resistance, with reference to Examples 5 and 6a to 6i in each case for a 10 mol-% or a 20 mol-% substitution of OH. The first stated value in each case here relates to the 10 mol-% and the second value to the 20 mol-% substitution.

TABLE 4

| Examples (OH-funct. polyurethane powder used) | Storage stability (flow time after 2 weeks storage at 40° C.; seconds) | Sag limit (μm) | Residual gloss before reflow (%) | Residual gloss after reflow (%) |
|---|---|---|---|---|
| 5 (./.) | 42 | 29 | 44 | 63 |
| 6a (1a) | 37; ./. | 30; ./. | 43; ./. | 63; ./. |
| 6b (1d) | ./.; 38 | ./.; 29 | ./.; ./. | ./.; ./. |
| 6c (1e) | 40; ./. | 29; ./. | ./.; ./. | ./.; ./. |
| 6d (1f) | 41; ./. | 34; ./. | 45; ./. | 66; ./. |
| 6e (1h) | ./.; 38 | ./.; 30 | ./.; ./. | ./.; ./. |
| 6f (1k) | ./.; 39 | ./.; 30 | ./.; 45 | ./.; 64 |
| 6g (1l) | ./.; 39 | ./.; 31 | ./.; 44 | ./.; 65 |
| 6h (2a) | 39; 35 | 29; 30 | 45; ./. | 66; ./. |
| 6i (2d) | ./.; 36 | ./.; 31 | ./.; 44 | ./.; 66 |

What is claimed is:

1. Non-aqueous, liquid coating compositions which contain at least one hydroxyl-functional component A, at least one hydroxyl-functional polyurethane resin B differing from the at least one component A and at least one crosslinking agent C with groups reactive towards the hydroxyl groups of A and B, wherein the at least one component A is not solid at room temperature and/or is present in dissolved form and wherein the at least one polyurethane resin B is present as particles having a melting temperature of 30 to 180° C.

2. The coating compositions of claim 1, wherein the solids content is 40 to 85 wt. %, organic solvent content is 15 to 60 wt. % and the sum of the wt.-% of solids content and the organic solvent content is 90 to 100 wt.-% and wherein the solids content consists of resin solids content and optional components: pigments, fillers and non-volatile additives.

3. The coating compositions of claim 2, wherein the resin solids content consists of 50 to 90 wt. % of binder solids content consisting of components A and B, 10 to 50 wt. % of one or more crosslinking agents C and 0 to 30 wt. % of one or more components D, wherein the weight percentages add up to 100 wt. %.

4. The coating compositions of claim 3, wherein the binder solids content consists of more than 0 to 95 wt. % of the at least one hydroxyl-functional component A and 5 to less than 100 wt. % of the at least one hydroxyl-functional polyurethane resin B, wherein the weight percentages add up to 100 wt. %.

5. The coating compositions of claim 1, wherein the solubility of the at least one polyurethane resin B is less than 10 g per liter of butyl acetate at 20° C.

6. The coating compositions of claim 1, wherein the average particle size of the polyurethane resin B particles determined by means of laser diffraction is 1 to 100 μm.

7. The coating compositions of claim 1, wherein the polyurethane resin B particles are formed by grinding of at least one solid polyurethane resin B or by hot dissolution of the at least one polyurethane resin B in a dissolution medium and subsequent particle formation during and/or after cooling.

8. The coating compositions of claim 1, wherein the at least one polyurethane resin B is a polyurethane diol which can be prepared by reacting 1,6-hexane diisocyanate with a diol component in the molar ratio x:(x+1), wherein x means any desired value from 2 to 6, wherein the diol component is one single diol or a combination of diols.

9. The coating compositions of claim 7, wherein the at least one polyurethane resin B is a polyurethane diol which can be prepared by reacting a diisocyanate component and a diol component in the molar ratio x:(x+1), wherein x means any desired value from 2 to 6, wherein 50 to 80 mol % of the diisocyanate component is formed by 1,6-hexane diisocyanate, and 20 to 50 mol % by one or two diisocyanates, each forming at least 10 mol of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein the mol % of the respective diols add up to 100 mol %.

10. A process for the preparation of a coating layer, comprising the successive steps:
1) applying a coating layer from a coating composition of claim 1,
2) optionally, flashing the applied coating layer to remove solvent, and
3) thermally curing the coating layer at temperature above the melting temperature of the at least one polyurethane resin B.

11. The process of claim 10, wherein the coating layer is selected from the group consisting of a single-layer coating and a coating layer within a multilayer coating.

12. The process of claim 11, wherein the coating layer within the multilayer coating is an automotive multilayer coating on a substrate selected from the group consisting of automotive bodies and automotive body parts.

13. The process of claim 12, wherein the coating layer is selected from the group consisting of a primer surfacer layer, an outer clear top coat layer and a transparent sealing layer.

* * * * *